United States Patent
Murakami

(10) Patent No.: US 9,254,575 B2
(45) Date of Patent: Feb. 9, 2016

(54) ATTACHMENT STRUCTURE FOR DRIVE CABLES OF ROBOT AND ROBOT APPARATUS PROVIDED THEREWITH

(71) Applicant: FANUC CORPORATION, Yamanashi (JP)

(72) Inventor: Wataru Murakami, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/316,269

(22) Filed: Jun. 26, 2014

(65) Prior Publication Data

US 2015/0007681 A1  Jan. 8, 2015

(30) Foreign Application Priority Data

Jul. 5, 2013  (JP) .................................. 2013-141689

(51) Int. Cl.
*B25J 19/00* (2006.01)

(52) U.S. Cl.
CPC ............ *B25J 19/0025* (2013.01); *Y10S 901/27* (2013.01); *Y10T 74/20311* (2015.01)

(58) Field of Classification Search
CPC ............ B25J 18/00; B25J 18/04; B25J 17/02; B25J 19/00; B25J 19/007; B25J 19/0025; B25J 19/0029; B25J 19/0033; Y10T 74/20311; Y10T 74/20317; Y10T 74/20329; Y10T 74/20335
USPC ............... 74/490.01–409.03, 490.05, 490.06; 901/23, 27, 29
See application file for complete search history.

(56) References Cited

U.S. PATENT DOCUMENTS

| | | | | |
|---|---|---|---|---|
| 4,767,257 | A | * | 8/1988 | Kato .................... B25J 19/0025 285/190 |
| 5,006,035 | A | * | 4/1991 | Nakashima et al. .......... 414/680 |
| 5,115,690 | A | * | 5/1992 | Torii et al. .................. 74/490.02 |
| 5,564,312 | A | * | 10/1996 | Brunman et al. .......... 74/490.02 |
| 6,250,174 | B1 | * | 6/2001 | Terada et al. ............... 74/490.02 |
| 6,408,710 | B1 | * | 6/2002 | Kullborg et al. ........... 74/490.03 |
| 8,863,606 | B2 | * | 10/2014 | Ichibangase et al. ...... 74/490.02 |
| 2004/0170363 | A1 | * | 9/2004 | Angela .......................... 385/100 |
| 2005/0011295 | A1 | * | 1/2005 | Shiraki et al. .............. 74/490.02 |
| 2009/0127530 | A1 | * | 5/2009 | Takeda ................. B25J 19/0025 254/387 |
| 2010/0032420 | A1 | * | 2/2010 | Inoue et al. .................... 219/136 |
| 2012/0111135 | A1 | * | 5/2012 | Ichibangase et al. ...... 74/490.06 |
| 2014/0103168 | A1 | * | 4/2014 | Kume .................. B25J 19/0025 248/51 |

FOREIGN PATENT DOCUMENTS

| | | |
|---|---|---|
| JP | 2005-014159 | 1/2005 |
| JP | 2011-115922 | 6/2011 |
| JP | 2012-000740 | 1/2012 |
| JP | 2013-141732 | 7/2013 |

* cited by examiner

*Primary Examiner* — William Kelleher
*Assistant Examiner* — Jude Agendia
(74) *Attorney, Agent, or Firm* — RatnerPrestia

(57) ABSTRACT

An attachment structure for drive cables include a first fixing member and a second fixing member separate from the first fixing member, which are designed to fix the drive cables in a non-slidable manner. The first fixing member is disposed behind a pivot body of a robot so as to pivot together with the pivot body. The second fixing member is disposed so as to be spaced apart from the first fixing member in a direction parallel to a rotational axis of an arm of the robot. The drive cables are fixed so as to be convexly curved upward in a portion between the first fixing member and the second fixing member.

6 Claims, 6 Drawing Sheets

ATTACHMENT STRUCTURE FOR DRIVE CABLES OF ROBOT AND ROBOT APPARATUS PROVIDED THEREWITH

BACKGROUND OF THE INVENTION

1. Field of the Invention

The present invention relates to an attachment structure for drive cables of a robot, and a robot apparatus provided with the attachment structure.

2. Description of the Related Art

In order to operate a multiple-joint robot as intended, it is necessary for the robot to be provided with power cables for supplying necessary power to a servo motor disposed at each joint, signal cables for transmitting and receiving signals to and from the servo motors or detectors which detect rotary movement of the servo-motors, and the like. It is preferable that drive cables installed on a robot (in the present specification, various cables necessary for operation and control of robot are hereinafter referred to as "drive cables") have an extra length so that excessive force can be prevented from exerting on the drive cables when the respective joints are in rotational movement. On the other hand, the drive cables with an extra length may sometimes have excessive slack, depending on the position and posture of the robot. Therefore, it is preferable that the drive cables are configured so as not to interfere with peripheral objects such as a hand, jig, workpiece, and other robots.

JP-A-2005-14159 discloses an attachment structure for cables of a robot. The attachment structure includes a hollow support structure on which the robot is placed, and the cables can be fixed and connected to a wiring connection in the interior of the support structure. According to another related art, an attachment structure has a configuration in which drive cables are wound around a cylindrical support structure. According to yet another related art, an attachment structure has a configuration in which a fixing member is provided to fix drive cables at a position away from a support structure of a robot to the rear.

However, in the attachment structure disclosed in JP-A-2005-14159, the drive cables cannot be easily introduced into the interior of the support structure, and therefore, the assembly and maintenance of the robot become complicated. Moreover, since a space is required to accommodate the extra length parts of the drive cables, the size of the support structure is increased. Furthermore, if the space requirements for the interior of the support structure are severe, it is necessary to specifically determine the length of the extra length parts of the drive cables, the direction in which the extra length parts extend, or the like, in order to prevent the drive cables from coming in contact with the support structure, which may result in damaging the drive cables, when the robot is in operation.

In the attachment structure configured by winding the drive cables around the support structure, a protection member is required in order to prevent the drive cables from coming in contact with the support structure, a cover attached to the support structure or the like, which may result in damaging the drive cables. In addition, in the attachment structure including the fixing member situated behind the support structure of the robot, a projecting part projecting in the space behind the robot becomes large, which increases the entire size of the robot apparatus.

Accordingly, there is a need for an attachment structure for drive cables of a robot, which is easy to handle and enhances working efficiency.

SUMMARY OF THE INVENTION

According to a first aspect of the present invention, an attachment structure for drive cables of a robot, wherein the robot comprises a movable part which is movable so that the robot has any given position and posture, and a stationary part which is fixed independently of the position and posture of the robot, wherein the movable part of the robot comprises: a pivot body attached to the stationary part so as to be able to pivot around a pivot axis; a first arm attached to the pivot body so as to be able to rotate around a first rotational axis; and a second arm attached to the first arm so as to be able to rotate around a second rotational axis, wherein the drive cables includes at least a power cable supplying power to a motor for driving the pivot body, the first arm and the second arm, and a signal cable for transmitting and receiving a signal to and from the motor, wherein the attachment structure comprises a first fixing member and a second fixing member separate from the first fixing member, each of which is configured to fix the drive cables non-slidably, wherein the first fixing member is disposed behind the pivot body so as to pivot together with the pivot body, wherein the second fixing member is disposed in the stationary part and at a distance away from the first fixing member in a direction parallel to the first rotational axis, and wherein the drive cables are fixed by the first fixing member and the second fixing member so as to be curved convexly upward between the first fixing member and the second fixing member, is provided.

According to a second aspect of the present invention, an attachment structure for drive cables of a robot, wherein the robot comprises a movable part which is movable so that the robot has any given position and posture, and a stationary part which is fixed independently of the position and posture of the robot, wherein the movable part of the robot comprises: a pivot body attached to the stationary part so as to be able to pivot around a pivot axis; a first arm attached to the pivot body so as to be able to rotate around a first rotational axis; and a second arm attached to the first arm so as to be able to rotate around a second rotational axis, wherein the drive cables includes at least a power cable supplying power to a motor for driving the pivot body, the first arm and the second arm, and a signal cable for transmitting and receiving a signal to and from the motor, wherein the attachment structure comprises a first fixing member and a second fixing member separate from the first fixing member, each of which is configured to fix the drive cables non-slidably, wherein the first fixing member is disposed behind the pivot body so as to pivot together with the pivot body, wherein the stationary part includes a support structure on which the robot can be placed, the support structure being open so as to be externally accessible, the second fixing member being disposed inside the support structure and at a position offset forward from the pivot axis, and wherein the driving cables are fixed by the first fixing member and the second fixing member so as to extend within the support structure across the pivot axis and between the first fixing member and the second fixing member, is provided.

According to a third aspect of the present invention, in the attachment structure for the drive cables of the robot according to the second aspect, the support structure is a structure separate from the robot.

According to a fourth aspect of the present invention, in the attachment structure for the drive cables of the robot according to the second or third aspect, the drive cables are fixed by the first fixing member and the second fixing member so as to be curved convexly toward the rear of the pivot body between the first fixing member and the second fixing member.

According to a fifth aspect of the present invention, in the attachment structure for the drive cables of the robot according to any one of the second to fourth aspects, the support structure comprises a first plate extending perpendicular to the pivot axis, a second plate disposed at a distance away from the first plate and extending parallel to the first plate, and at least one support column extending parallel to the pivot axis so as to connect the first plate and the second plate each other.

According to a sixth aspect of the present invention, in the attachment structure for the drive cables of the robot according to any one of the first to fifth aspects, the robot is an arc welding robot, a spot welding robot, a material handling robot, or a painting robot.

According to a seventh aspect of the present invention, a robot apparatus comprising a multiple-joint robot, and the attachment structure for the drive cables of the robot according to any one of the first to fifth aspects, is provided.

These and other objects, features and advantages of the present invention will become more apparent in light of the detailed description of exemplary embodiments thereof as illustrated by the drawings.

DETAILED DESCRIPTION OF THE INVENTION

Embodiments of the invention are hereinafter described referring to the accompanying drawings. Constituent elements of the illustrated embodiments may be modified in size in relation to one another for better understanding of the present invention. The same ore corresponding constituent elements in a plurality of embodiments are designated with the same referential numeral, and overlapping explanation may be omitted as necessary.

Figure 1:
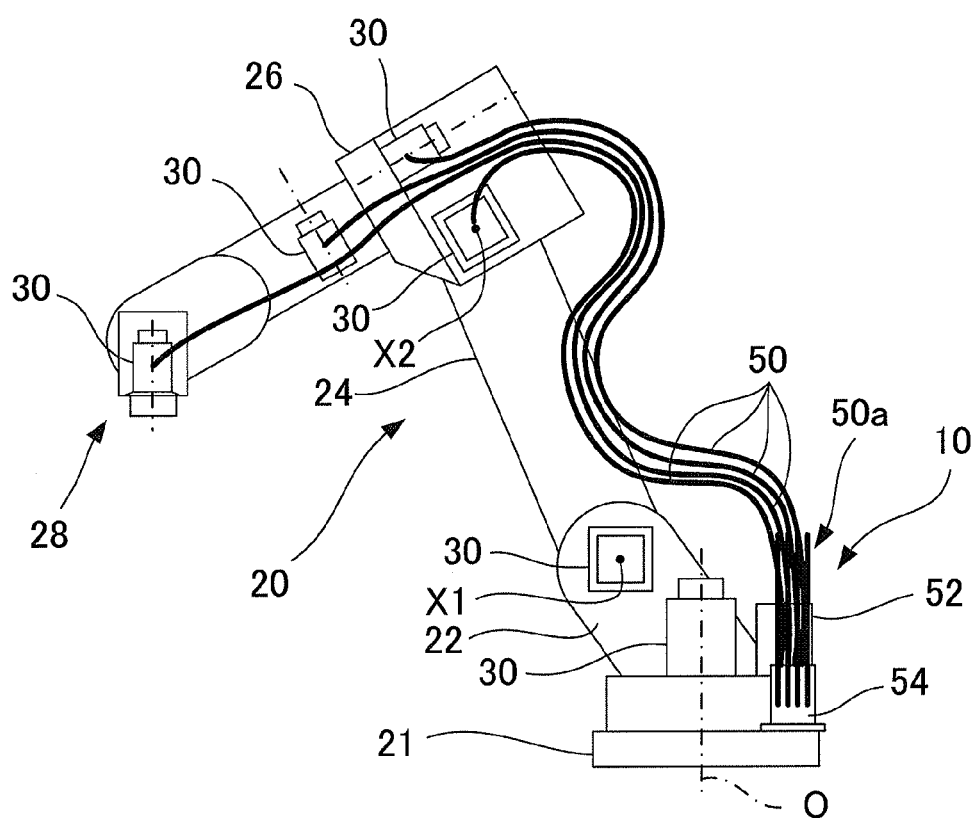
FIG. 1 is a side view schematically illustrating an attachment structure for drive cables of a robot according to a first embodiment.
Figure 2:
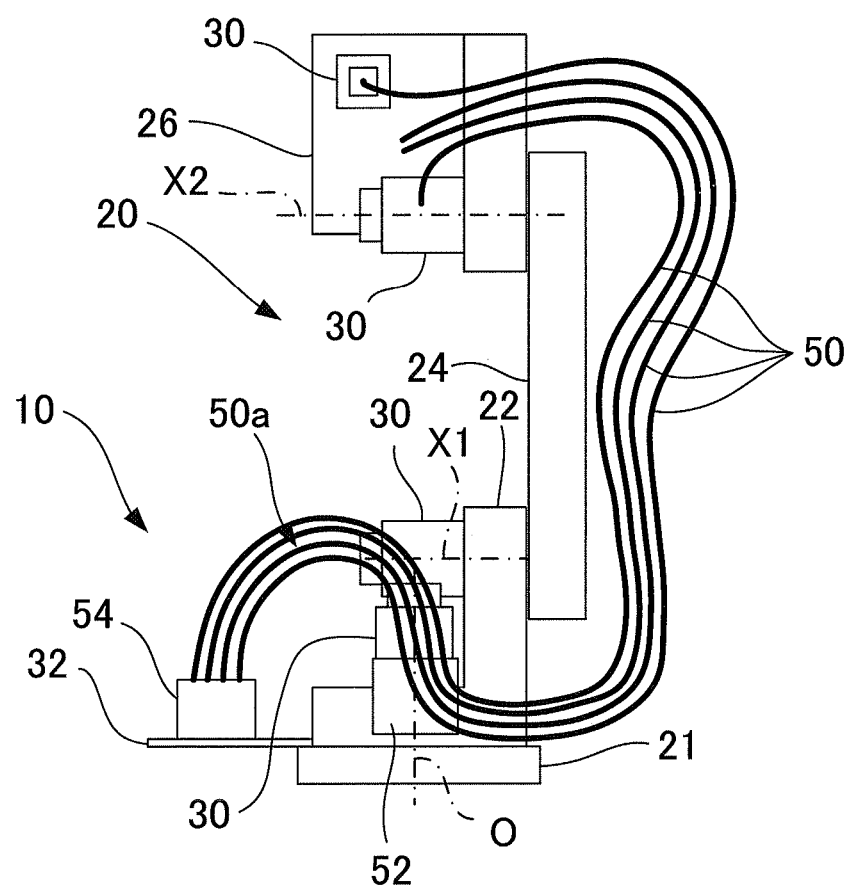
FIG. 2 is a rear view schematically illustrating the attachment structure in FIG. 1.

FIG. 1 is a side view schematically illustrating an attachment structure 10 for drive cables of a robot according to a first embodiment. FIG. 2 is a rear view of the attachment structure 10. The attachment structure 10 is used to install drive cables 50 used in a multiple-joint robot 20 as illustrated, and constitutes a robot apparatus together with the robot 20.

The robot 20 includes a base 21 which is fixed to an installation surface (not illustrated) on which the robot 20 is installed, and constitutes a stationary part of the robot 20, a pivot body 22 attached to the base 21 so as to be able to pivot around a pivot axis O, a first arm 24 attached to the pivot body 22 so as to be able to rotate around a first rotational axis X1 with respect to the pivot body 22, a second arm 26 attached to the first arm 24 so as to be able to rotate around a second rotational axis X2 with respect to the first arm 24, and a wrist unit 28 provided at the tip of the robot 20 and designed to receive various tools. The robot 20 also includes motors (servo motors) 30 at the respective joints in order to produce rotational movement.

The pivot body 22, the first arm 24, the second arm 26, and the wrist unit 28 constitute a movable part of the robot 20, which moves in accordance with control commands to allows the robot 20 to have any given position and posture. The robot 20 is illustrated only by way of example, and a robot to which the invention can be applied may also have any other configuration.

The drive cables 50 are a bundle of a plurality of cables which may include power cables for supplying power to the respective motors 30, and signal cables for transmitting and receiving signals to and from the motors 30 and detectors, such as encoders designed to detect rotary movement of the motors 30. The drive cables 50 may also include another type of cables. Although the drive cables 50 are individually illustrated in FIGS. 1 and 2, in order to enhance visibility, the drive cables 50 are generally bundled together by binding means such as a clip, clamp, and band, and branched off in the vicinity of the corresponding motors 30.

The drive cables 50 are fixed by a first fixing member 52 and a second fixing member 54 on the base end side, or near the base 21 of the robot 20. According to the present embodiment, the first fixing member 52 is disposed behind the pivot body 22 so as to pivot together with the pivot body 22. The first fixing member 52 has a known fixing structure designed to fix the drive cables in a non-slidable manner. For example, the first fixing member 52 may include, but not limited to, a clip, a clamp, or a band.

The term "fixing non-slidably" in the present specification means a state in which a part of the drive cables is fixedly held so that the drive cables cannot substantially slide in a longitudinal direction. The directions expressed by terms such as "rear," "behind," or "lateral" are directions viewed from a reference position of the pivot body 22, i.e., viewed from the pivot body 22 when the pivoting angle is zero degree, unless otherwise specified. The "front" represents a direction in which the wrist unit 28 of the robot 20 is generally positioned when viewed from the pivot body 22. For example, FIG. 1 illustrates the robot 20 when the pivoting angle is zero degree. Therefore, the left side in FIG. 1 is "front," and the right side is "rear." The "leftward" and "rightward" used in the present specification are similarly defined with reference to the pivot body 22, and correspond to the left-hand direction and right-hand direction in FIG. 2, respectively.

The second fixing member 54 is disposed on an extension member 32 extending leftward from the base 21 of the robot 20 and being fixed independently of movement of the pivot body 22. The second fixing member 54 has the same or different configuration as/from the first fixing member 52, and is designed to fix the drive cables 50 in a non-slidable manner. The second fixing member 54 may be provided on an extended portion of the base 21, which is a part of the base 21 extending leftward, without the extension member 32 separate from the base 21. Since the second fixing member 54 is disposed on the extension member 32 or the extended portion on the base 21, the size of the base 21 can be reduced as much as possible.

As illustrated in FIG. 2, the first fixing member 52 and the second fixing member 54 are disposed so as to be spaced apart from each other in the direction of the rotational axis X1 of the first arm 24. The drive cables 50 have an extra length part 50a convexly curved upward in a portion between the first fixing member 52 and the second fixing member 54. When the pivoting angle of the pivot body 22 is zero degree as illustrated in FIG. 2, the extra length part 50a is formed in the drive cables 50 so as to have an appropriate shape such as an inverted U-shape, parabolic shape, and circular-arc shape, as necessary. Specifically, the length of the extra length part 50a is determined in consideration of various factors, such as the expected pivoting angle of the pivot body 22, the movable range of the first arm 24, the flexibility and the tensile strength of the drive cables 50.

Although the second fixing member 54 is disposed on the left side of the pivot body 22 in the illustrated embodiment, the position of the second fixing member 54 depends on the positional relationship between the pivot body 22 and the first arm 24. For example, in the case where the first arm 24 is disposed on the opposite side of the illustrated position, i.e., on the left side of the pivot body 22, the second fixing member 54 is disposed on the right side of the pivot body 22. In this way, the position of the second fixing member 54 is determined in consideration of the positional relationship between the pivot body 22 and the first arm 24, and therefore the second fixing member 54 and the extra length part 50a of the drive cables 50 can be prevented from coming in contact with the first arm 24.

According to the attachment structure in the present embodiment, the extra length part 50a of the drive cables 50 is formed on the side of the robot 20, so as to have a curved shape extending upward. By virtue of the extra length part, at least one of torsion and bending of the drive cables due to pivoting movement of the pivot body can be absorbed. In addition, as can be seen in FIG. 1, a portion of the drive cables 50 projecting toward the space behind the robot 20 can be reduced. In general, the space behind the robot is not utilized during operation of the robot, and it is preferable that the space behind the robot is not occupied by the robot and the peripheral equipment. The present embodiment advantageously ensures that the space behind the robot 20 is available and that the drive cables 50 have a sufficient extra length.

Moreover, according to the present embodiment, a separate support structure for accommodating the drive cables is unnecessary. Accordingly, the base 21 of the robot 20 can be downsized, the handling of the robot apparatus can be facilitated, and the space required for the installation of the robot 20 becomes compact. Further, since it is unnecessary to provide for a protection cover for cables, which have been used hitherto in order to prevent the drive cables from being damaged as a result of coming in contact with the support structure, the cost can be reduced. Furthermore, it is unnecessary to involve the steps of winding the cables around the support structure and installing the cables through the support structure. This facilitates the installation and removal of the drive cables, enhancing working efficiency.

Figure 3:
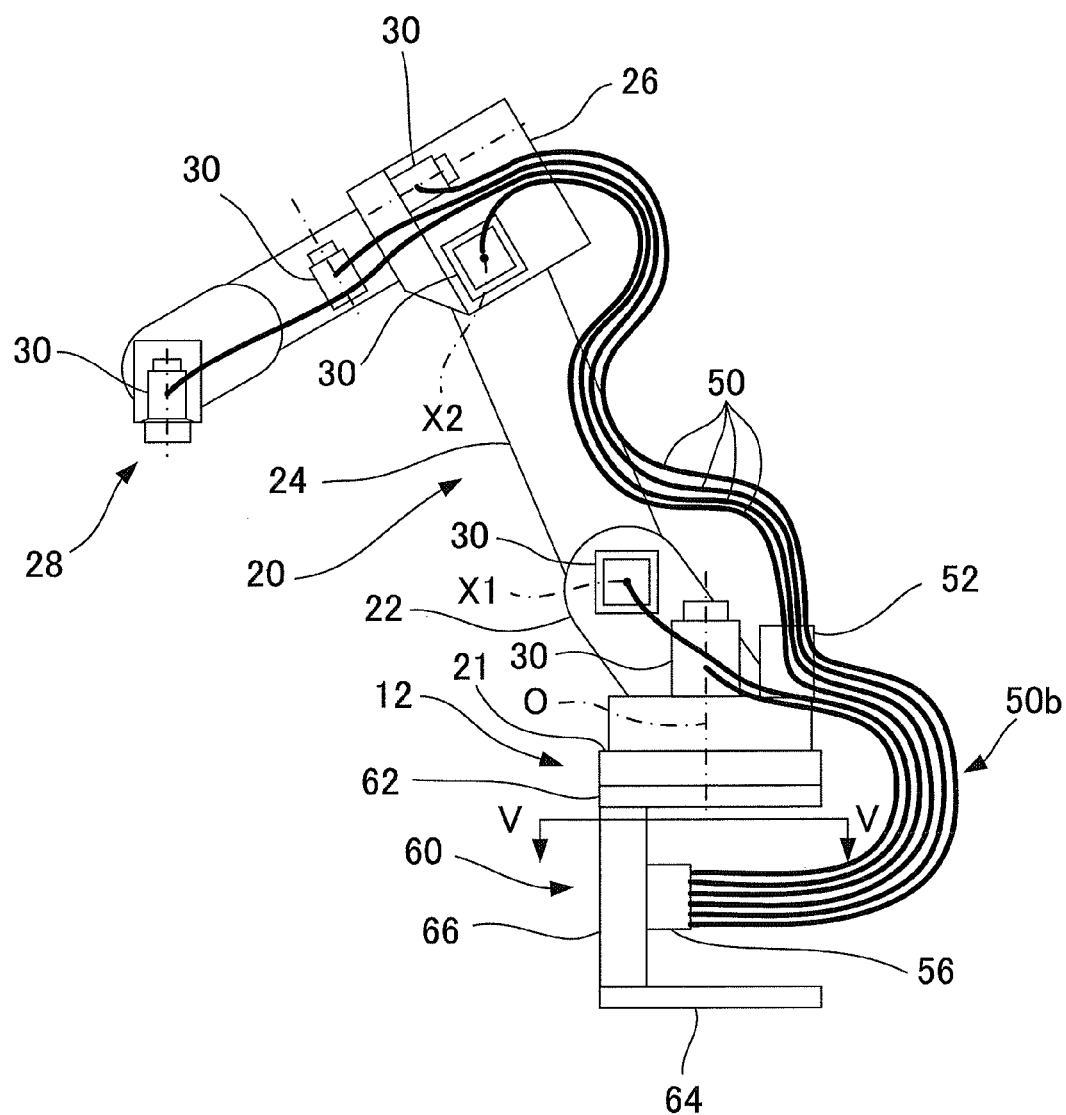
FIG. 3 is a side view schematically illustrating an attachment structure for drive cables of a robot according to a second embodiment.
Figure 4:
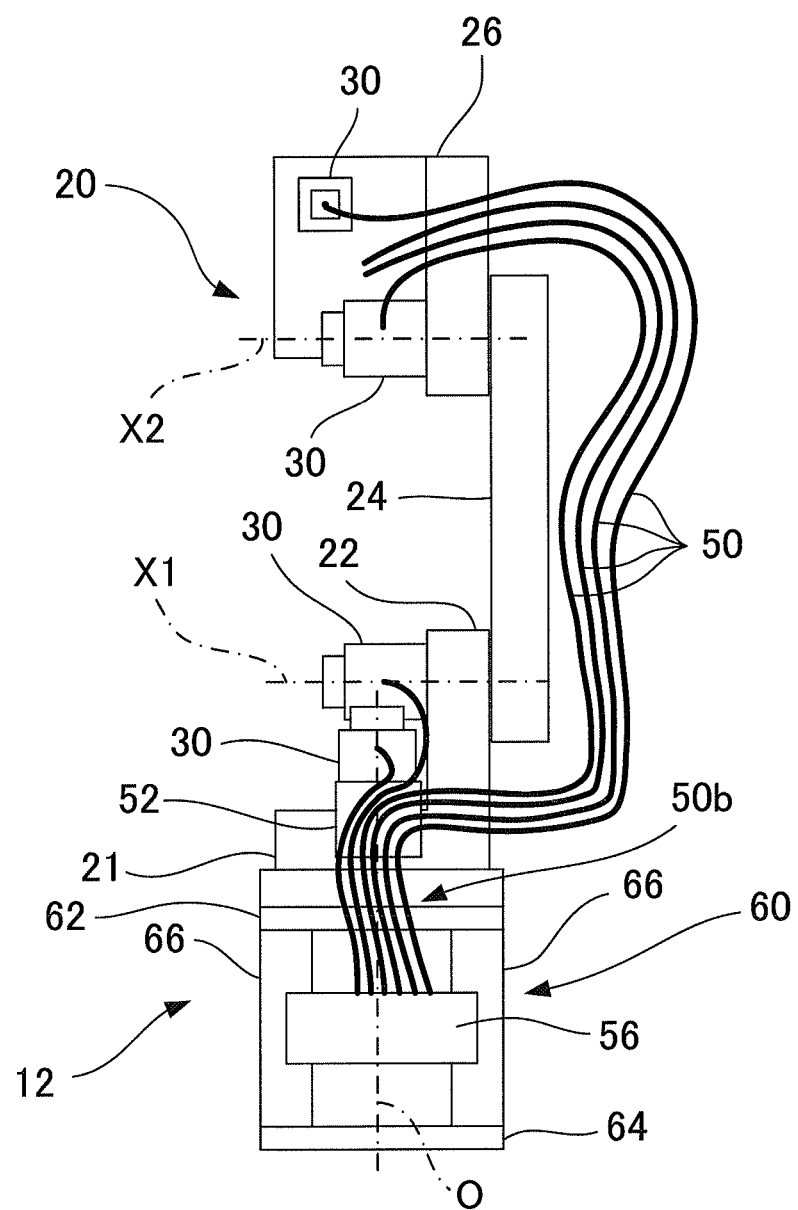
FIG. 4 is a rear view schematically illustrating the attachment structure in FIG. 3.
Figure 5:
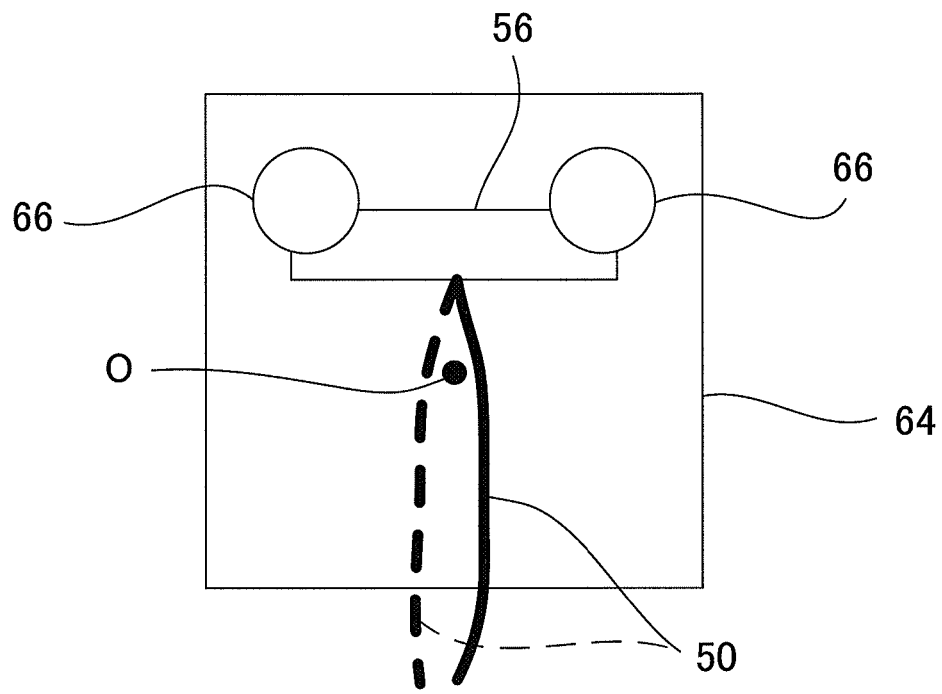
FIG. 5 is a cross-sectional view taken along a line V-V in FIG. 3.

FIG. 3 is a side view schematically illustrating an attachment structure 12 for drive cables of a robot according to a second embodiment. FIG. 4 is a rear view schematically illustrating the attachment structure 12 in FIG. 3. FIG. 5 is a cross-sectional view taken along a line V-V in FIG. 3. In the present embodiment, the robot 20 is placed on a stand 60. The stand 60 is fixed to a supporting surface (not illustrated) of the robot 20 together with the base 21 of the robot 20, independently of the position and posture of the robot 20.

The stand 60 includes an upper plate 62 having a generally rectangular parallelepiped shape and extending at right angles to the pivot axis O such that the base 21 of the robot 20 can be placed on the upper plate 62, a lower plate 64 having a generally rectangular parallelepiped shape and extending parallel to the upper plate 62 at a distance away from the upper plate 62 in the vertical direction (a direction parallel to the pivot axis O), and two support columns 66 extending in the vertical direction between the upper plate 62 and the lower plate 64. The support columns 66 extend so as to be spaced apart from each other, and are disposed at positions offset from the pivot axis O. The support columns 66 are not limited to a cylindrical shape as shown in the drawings, but may also have a polygon pole shape. The stand 60 has a combined structure of plates and columns. This makes it possible to easily access the interior of the stand 60 from the outside.

The attachment structure 12 includes a first fixing member 52 and a second fixing member 56. The first fixing member 52 has a configuration similar to that of the first fixing member described in relation to the first embodiment. On the other hand, the second fixing member 56 in the present embodiment is attached to the support columns 66 in the interior of the stand 60 so as to bridge a gap therebetween (see FIG. 5). Accordingly, the second fixing member 56 is disposed at a position offset from the pivot axis O.

The drive cables 50 have an extra length part 50b having a curved shape extending rearward between the first fixing member 52 and the second fixing member 56. Similarly to the extra length part 50a in the first embodiment, the extra length part 50b may have a given shape, such as an inverted U-shape, parabolic shape, and circular-arc shape. The drive cables 50 extend from the opened rear side of the stand 60 to the second fixing member 56. In FIG. 5, a bold solid line represents the drive cables 50 extending between the first fixing member 52 and the second fixing member 56, and a bold dashed line represents the drive cables 50 extending from the second fixing member 56 to the outside.

Figure 6:
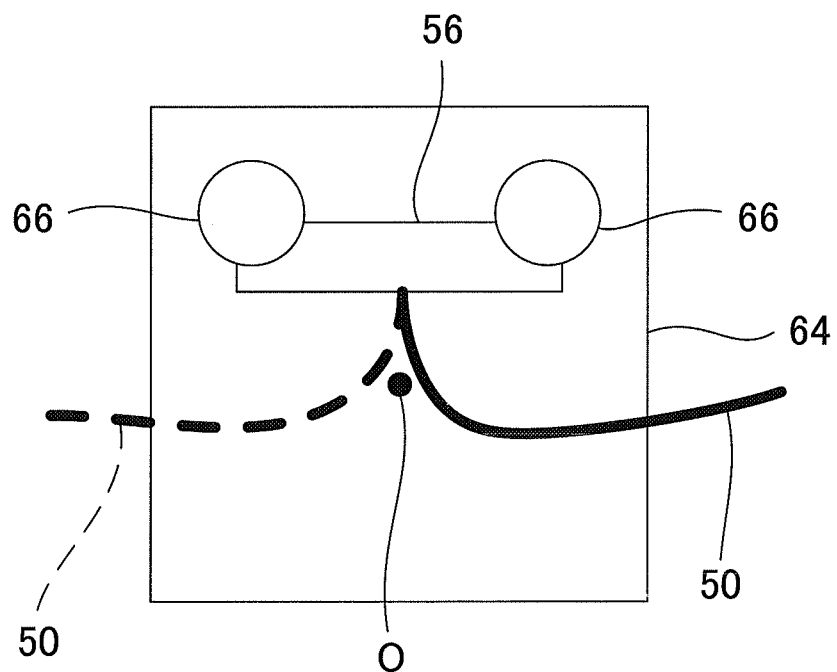
FIG. 6 corresponds to FIG. 5, but shows a state where the robot is rotated by 180 degrees.

FIG. 6 corresponds to FIG. 5 when the robot 20 pivots by 180 degrees from the state shown in FIG. 5 in which the pivot body 22 is in the reference position. In either state shown in FIGS. 5 and 6, the drive cables 50 extend into the stand 60 across the pivot axis O. In this way, the drive cables 50 are designed to freely bend in the interior of the stand 60, while being supported by the second fixing member 56. This allows the drive cables 50 to absorb a tensile action and compressive action generated therein as a result of movement of the robot 20, in particular, pivoting movement of the pivot body 22.

The shape of the stand is not limited to the illustrated one, but the stand may have another configuration. For example, the stand may have only one support column, or three or more support columns. In the latter case, the second fixing member is fixed to at least one of the support columns. The second fixing member may be attached to at least one of the upper plate and the lower plate. The stand may have various other configurations, but preferably have a configuration in which it is open at least on the rear side so that the drive cables can be easily introduced to the inside of the stand from the rear side.

According to this embodiment, the drive cables 50 are introduced to the inside of the stand 60 from the opened rear side of the stand 60. Accordingly, an operator can easily access the second fixing member 56 positioned inside the stand 60 in order to fix the drive cables 50 to the second fixing member 56, and the working efficiency during installation and removal of the drive cables can be enhanced. Moreover, the robot 20 is placed on the stand 60, and there is no constituent element around the pivot body 22, which may become an obstacle to the pivot body 22. Therefore, the movable range of the robot 20, in particular, the movable range of the pivot body 22 can be easily broadened.

The stand 60 may be integrally formed with the robot 20, or may be a constituent element separate from the robot 20. In the case where the stand 60 is formed separately from the robot 20, the manner of the installation of the drive cables 50 can be easily changed from the attachment structure 10 in the first embodiment to the attachment structure 12 in the second embodiment, by placing the robot 20 illustrated in FIGS. 1 and 2 on the stand 60 and fixing the robot 20 thereto. For example, when broadening the movable range of the robot 20, in particular, the movable range of the pivot body 22, is preferred, it is advantageous that the attachment structure 10 can be easily changed to the attachment structure 12 in the second embodiment.

Further, the drive cables 50 extend between the first fixing member 52 and the second fixing member 56 so as to be convexly curved rearward from the pivot body 22. Accordingly, the second arm 26 and the drive cables 50 can be prevented from coming in contact with each other even when the second arm 26 rotates and approaches the stand 60. This ensures a broader movable range of the second arm 26. In contrast, in the case where the drive cables 50 extend between the first fixing member 52 and the second fixing member 56 so as to be convexly curved toward the pivot body 22, there is a risk of the second arm 26 coming in contact with the drive cables 50 when the second arm 26 approaches the stand 60. In the latter case, the movable range of the second arm 26 may be restricted.

Figure 7:
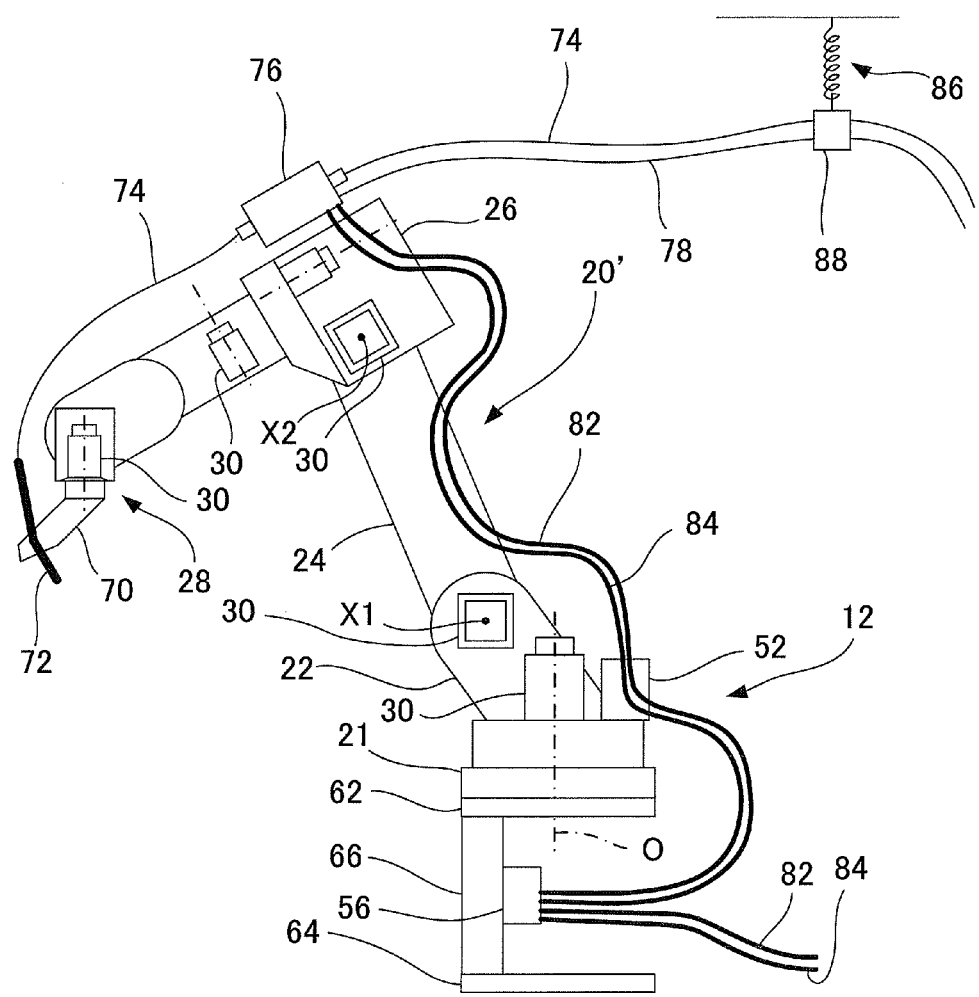
FIG. 7 is a side view schematically illustrating an arc welding robot to which the invention can be applied.

FIG. 7 shows an exemplary application of the attachment structure 12 according to the second embodiment to an arc welding robot 20'. In FIG. 7, the drive cables are not illustrated for better visibility, but only additional cables necessary for implementing arc welding are illustrated.

The arc welding robot 20' includes a tool 70 attached to the wrist unit 28, a welding torch 72 held by the tool 70, and a wire feeding device 76 for feeding a conduit 74 which is connected to the welding torch 72 at its one end and contains a wire for providing for a gas necessary for carrying out the arc welding. The wire feeding device 76 is connected with a power cable 78. The power cable 78 and the conduit 74 are held by a holding member 88 hanging from a spring 86.

According to this embodiment, a gas hose 82 and a control cable 84 of the wire feeding device 76 are fixed by the first fixing member 52 and the second fixing member 56 together with the drive cables, which are not illustrated. The gas hose 82 and the control cable 84 are installed up to the wire supply device 76 through the same route as the drive cables for driving the motors 30. Accordingly, even in the case where the arc welding robot 20' is used in combination with the attachment structure 12 for the drive cables, the above advantages mentioned in relation to the attachment structure 12 can be enjoyed as well.

Although not illustrated, it is obvious for those skilled in the art that the arc welding robot can be used in combination with the attachment structure 10 in the first embodiment. It is also obvious for those skilled in the art that a known robot other than the arc welding robot, such as a spot welding robot, material handling robot, and painting robot, may be used in combination with the attachment structure according to the present invention.

EFFECT OF THE INVENTION

According to the attachment structure having the above-described configuration, there is no need to install the drive cables though the interior of the support structure, which is difficult to access, thereby enhancing the working efficiency. Moreover, since the drive cables are provided with a sufficient extra length without increasing the size of the support structure, the movable range of the robot can be easily broadened. Further, the rearward space necessary for installation of the robot can become compact.

When the support structure is formed separately from the robot, the attachment structure according to the first aspect can be changed to the attachment structure according to the second aspect by fixing the robot to the support structure. According to the second aspect, there is no constituent element around the pivot body of the robot, which may become an obstacle, and therefore the movable range of the robot, in particular, the movable range of the pivot body, can be easily broadened.

According to the fourth aspect, the drive cables extend between the first fixing member and the second fixing member so as to be convexly curved rearward from the pivot body. Accordingly, there is no risk of the second arm coming in contact with the drive cables, even when the second arm rotates and approaches the support structure. This ensures a broader movable range of the second arm.

According to the robot apparatus having the above-described configuration, the above advantages mentioned in relation to the attachment structure can be also enjoyed.

Although various embodiments and modifications of the present invention have been described, it is obvious for those skilled in the art that other embodiments and modifications can also realize the intended effects and advantages of the invention. In particular, it is possible to omit or replace the constituent elements of the embodiments and modifications described herein, or add a known means thereto, without departing from the scope of the invention. It is also obvious for those skilled in the art that the invention can be implemented by any combination of the features of the embodiments explicitly or implicitly disclosed herein.

What is claimed is:

1. An attachment structure for drive cables of a robot,
wherein the robot comprises a movable part which is movable so that the robot has any given position and posture, and a stationary part which is fixed independently of the position and posture of the robot,
wherein the movable part of the robot comprises:
a pivot body attached to the stationary part so as to be able to pivot around a pivot axis;
a first arm attached to the pivot body so as to be able to rotate around a first rotational axis extending in a direction perpendicular to the pivot axis; and
a second arm attached to the first arm so as to be able to rotate around a second rotational axis extending in a direction perpendicular to the first rotational axis,
wherein the drive cables includes at least a power cable supplying power to a motor for driving the pivot body, the first arm and the second arm, and a signal cable for transmitting and receiving a signal to and from the motor,
wherein the attachment structure comprises a first fixing member and a second fixing member separate from the first fixing member, the first fixing member being configured to fix a first part of the drive cables non-slidably, the second fixing member being configured to fix a second part of the drive cables non-slidably,
wherein the first fixing member is disposed behind the pivot body so as to pivot together with the pivot body,
wherein the second fixing member is disposed in the stationary part and at a distance away from the first fixing member in a direction parallel to the first rotational axis, and
wherein the drive cables are fixed by the first fixing member and the second fixing member so as to be curved convexly vertically upward between the first fixing member and the second fixing member.

2. The attachment structure for the drive cables of the robot according to claim 1, wherein the robot is an arc welding robot, a spot welding robot, a material handling robot, or a painting robot.

3. A robot apparatus comprising:
the attachment structure for the drive cables of the robot according to claim 1; and
a multiple-joint robot comprising the pivot body, the first arm and the second arm.

4. An attachment structure for drive cables of a robot,
wherein the robot comprises a movable part which is movable so that the robot has any given position and posture, and a stationary part which is fixed independently of the position and posture of the robot,
wherein the movable part of the robot comprises:
a pivot body attached to the stationary part so as to be able to pivot around a pivot axis;
a first arm attached to the pivot body so as to be able to rotate around a first rotational axis extending in a direction perpendicular to the pivot axis; and
a second arm attached to the first arm so as to be able to rotate around a second rotational axis extending in a direction perpendicular to the first rotational axis,
wherein the drive cables includes at least a power cable supplying power to a motor for driving the pivot body, the first arm and the second arm, and a signal cable for transmitting and receiving a signal to and from the motor,
wherein the attachment structure comprises a first fixing member and a second fixing member separate from the first fixing member, the first fixing member being configured to fix a first part of the drive cables non-slidably, the second fixing member being configured to fix a second part of the drive cables non-slidably,
wherein the first fixing member is disposed behind the pivot body so as to pivot together with the pivot body,
wherein the stationary part includes a support structure on which the robot can be placed, the support structure being open so as to be externally accessible, the second fixing member being disposed inside the support structure and at a position offset forward from the pivot axis, and
wherein the drive cables are fixed by the first fixing member and the second fixing member so as to extend within the support structure across the pivot axis and between the first fixing member and the second fixing member and so as to be curved convexly toward an opposite direction of a tip of the second arm.

5. The attachment structure for the drive cables of the robot according to claim 4, wherein the support structure is a structure separate from the robot.

6. The attachment structure for the drive cables of the robot according to claim 4, wherein the support structure comprises a first plate extending perpendicular to the pivot axis, a second plate disposed at a distance away from the first plate and extending parallel to the first plate, and at least one support column extending parallel to the pivot axis so as to connect the first plate and the second plate each other.

* * * * *